(12) United States Patent
Ariizumi

(10) Patent No.: US 11,906,049 B2
(45) Date of Patent: Feb. 20, 2024

(54) SEALING DEVICE

(71) Applicant: NOK CORPORATION, Tokyo (JP)

(72) Inventor: Manabu Ariizumi, Fukushima (JP)

(73) Assignee: NOK CORPORATION (JP)

( * ) Notice: Subject to any disclaimer, the term of this patent is extended or adjusted under 35 U.S.C. 154(b) by 26 days.

(21) Appl. No.: 17/604,090

(22) PCT Filed: May 13, 2020

(86) PCT No.: PCT/JP2020/019064
§ 371 (c)(1),
(2) Date: Oct. 15, 2021

(87) PCT Pub. No.: WO2020/246206
PCT Pub. Date: Dec. 10, 2020

(65) Prior Publication Data
US 2022/0205539 A1  Jun. 30, 2022

(30) Foreign Application Priority Data
Jun. 5, 2019  (JP) .................. 2019-105378

(51) Int. Cl.
F16J 15/3232  (2016.01)
(52) U.S. Cl.
CPC ................ F16J 15/3232 (2013.01)
(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS

2008/0029967 A1* 2/2008 Nakagawa ........... F16J 15/3256
277/423
2010/0244388 A1* 9/2010 Nakagawa .......... F16C 33/7886
277/559
(Continued)

FOREIGN PATENT DOCUMENTS

CN  206682305 U  11/2017
JP  S60194665 U  * 12/1985
(Continued)

OTHER PUBLICATIONS

Notice of Reasons for Refusal for corresponding Japanese Application No. 2021-524725 dated Sep. 27, 2022 with English translation (10 Pages).

(Continued)

Primary Examiner — Nathan Cumar
(74) Attorney, Agent, or Firm — Harness, Dickey & Pierce, P.L.C.

(57) ABSTRACT

A sealing device includes: a sealing device main body to be attached to an outer periphery side member; and a slinger to be attached to an inner periphery side member. The sealing device main body includes: an annular reinforcement ring centered on an axis; and an annular elastic body part that is made of an elastic body attached to the reinforcement ring and is centered on the axis. A through hole that passes through a portion between an internal space side surface and an atmosphere side surface of the reinforcement ring is formed in the reinforcement ring, and a positioning part for fixing the position of the reinforcement ring at the time of vulcanization is formed on an internal space side surface of the elastic body part. In the sealing device, the through hole and the positioning part are formed at positions separated in the radial direction.

3 Claims, 3 Drawing Sheets

(58) Field of Classification Search
CPC .. F16J 15/3208; F16J 15/3212; F16J 15/3216; F16J 15/322; F16J 15/3228; F16J 15/3232
USPC .......................................................... 277/562
See application file for complete search history.

(56) References Cited

U.S. PATENT DOCUMENTS

2013/0341873 A1* 12/2013 Benedix ............... F16J 15/3244
277/561
2016/0250788 A1 9/2016 Kato et al.

FOREIGN PATENT DOCUMENTS

| JP | H03-020175 | A | 1/1991 |
| JP | H03-085761 | U | 8/1991 |
| JP | 2005-226826 | A | 8/2005 |
| JP | 2009-216138 | A | 9/2009 |
| JP | 2010-185465 | A | 8/2010 |
| JP | 4978074 | B2 | 7/2012 |
| JP | 2012-145199 | A | 8/2012 |
| JP | 2014-126105 | A | 7/2014 |
| JP | 2015-059644 | A | 3/2015 |
| JP | 2015-098881 | A | 5/2015 |
| JP | 2016-138654 | A | 8/2016 |
| KR | 2006-0131366 | A | 12/2006 |

OTHER PUBLICATIONS

Written Opinion for corresponding International Application No. PCT/JP2020/019064 dated Aug. 4, 2020, with English translation (8 Pages).
International Preliminary Report on Patentability for corresponding International Application No. PCT/JP2020/019064 dated Dec. 7, 2021, with English translation (10 Pages).
International Search Report (English and Japanese) of the International Searching Authority issued in PCT/JP2020/019064, dated Aug. 4, 2020; ISA/JP (5 pages).
Notice of Reasons for Refusal for corresponding Japanese Application No. 2021-524725 dated Mar. 7, 2023, with English translation (10 Pages).
Extended European Search Report issued in corresponding Application No. 20818041.4 dated Jun. 1, 2023 (8 Pages).

* cited by examiner

SEALING DEVICE

CROSS REFERENCE TO RELATED APPLICATIONS

The present application is a national stage application of International Patent Application No. PCT/JP2020/019064 filed on May 13, 2020, which claims the benefit of Japanese Patent Application No. 2019-105378, filed on Jun. 5, 2019. The contents of the above applications are incorporated herein by reference in their entirety.

BACKGROUND

Technical Field

The present disclosure relates to a sealing device.

Related Art

Up to now, a sealing device including a plurality of relatively rotatable members has been widely used. As this type of sealing device, known is a sealing device including: one of two relatively rotatable members, for example, a slinger fixed to a rotating shaft; and the other of the two relatively rotatable members, for example, a sealing device main body fixed to an inner periphery side surface of a shaft hole of a housing (for example, see Japanese Patent No. 4978074).

Such a sealing device is used to seal a lubricant or the like in an internal space of a vehicle, a general-purpose machine, or the like. The slinger is provided with a flange, and this flange prevents or reduces invasion of dirt and dust from the atmosphere side to the internal space side. Therefore, such a sealing device is used in an environment full of dirt or dust, for example, a truck of a railroad vehicle, a truck of a sintering pallet, a construction machine, a trunnion-type suspension of a truck, and an agricultural machine.

The sealing device main body of such a sealing device includes: an annular reinforcement ring; and an elastic body part made of a rubber material that is formed so as to cover the reinforcement ring integrally therewith. The reinforcement ring, the elastic body part is bonded to the reinforcement ring by cross-linking adhesion, whereby the elastic body part is formed integrally with the reinforcement ring.

In some cases, holes for improving the adhesion force between the elastic body part and the reinforcement ring are provided at regular intervals in the reinforcement ring, and the inside of each hole is filled with a rubber material. In some cases, grooves formed by holding the reinforcement ring at the time of the cross-linking adhesion are provided at regular intervals on an internal space side surface of the elastic body part. Here, in the case where the holes of the reinforcement ring and the grooves of the elastic body part have a portion overlapping in the radial direction, there is a possibility that: due to swelling and shrinking of the rubber material caused by the attachment of a solvent, a crack occurs from a thinner portion of the rubber material of the elastic body part; and this crack grows through the rubber material inside of the holes of the reinforcement ring to become a through crack. Therefore, the conventional sealing device is required to have a structure in which the occurrence of such a through crack in the rubber material of the elastic body part can be further suppressed.

The present disclosure has been made in view of the above-mentioned problem, and it is an object of the present disclosure to provide a sealing device in which the occurrence of a through crack in a rubber material of an elastic body part can be further suppressed.

SUMMARY

In order to achieve the above-mentioned object, a sealing device according to the present disclosure is a sealing device that seals a gap between: an annular outer periphery side member; and an annular inner periphery side member at least partially surrounded by the outer periphery side member, the outer periphery side member and the inner periphery side member being relatively rotatable to each other with respect to an axis, the sealing device being characterized by including: a sealing device main body to be attached to the outer periphery side member; and a slinger to be attached to the inner periphery side member, wherein the sealing device main body includes: an annular reinforcement ring centered on the axis; and an annular elastic body part that is made of an elastic body attached to the reinforcement ring and is centered on the axis, a through hole that passes through a portion between an internal space side surface and an atmosphere side surface of the reinforcement ring is formed in the reinforcement ring, a positioning part for fixing a position of the reinforcement ring at a time of vulcanization is formed on an internal space side surface of the elastic body part, and the through hole and the positioning part are formed at positions separated in a radial direction.

In the sealing device according to an aspect of the present disclosure, a thickness of the elastic body part formed on an atmosphere side of the reinforcement ring is thicker than a thickness of the elastic body part formed on an internal space side of the reinforcement ring.

In the sealing device according to an aspect of the present disclosure, the positioning part is an annular groove part that is formed on an outer periphery side and/or an inner periphery side of the through hole and is concave from an internal space side to an atmosphere side.

Effects of Disclosure

According to a sealing device of the present disclosure, the occurrence of a through crack in a rubber material of an elastic body part can be further suppressed.

DETAILED DESCRIPTION

Hereinafter, an embodiment of the present disclosure will be described with reference to the drawings.

Figure 1:
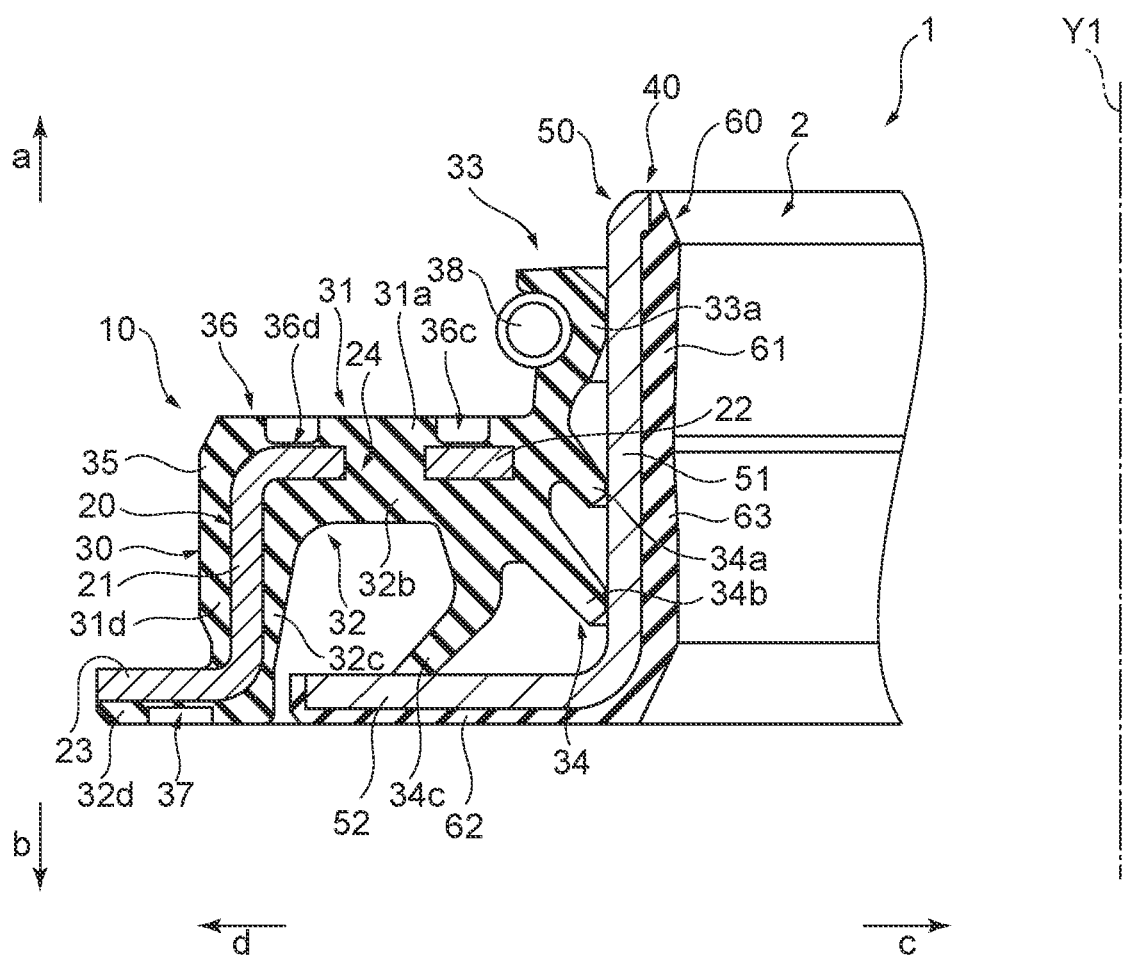
FIG. 1 is a sectional view for showing a schematic configuration of a sealing device according to an embodiment of the present disclosure.
Figure 2:
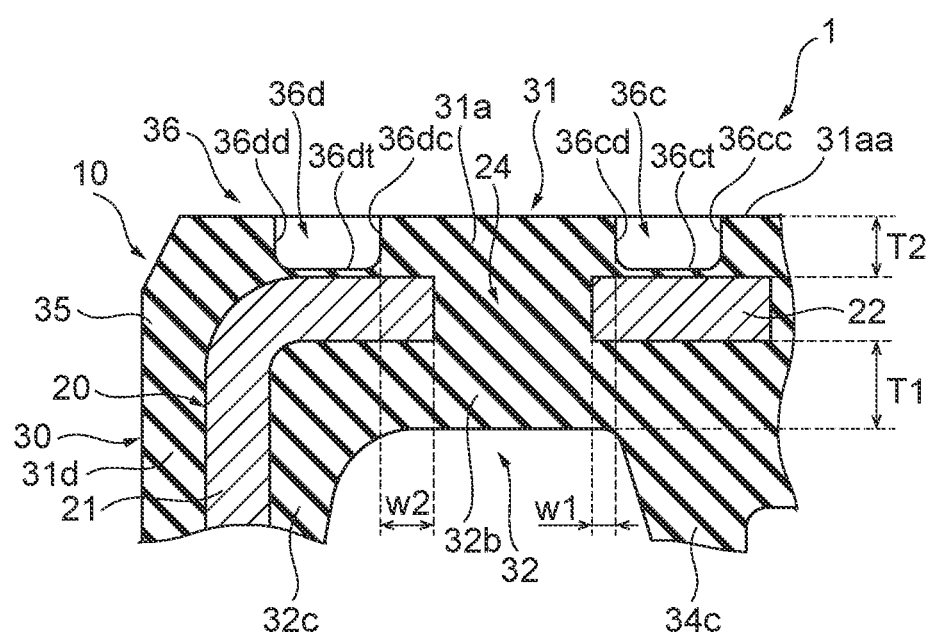
FIG. 2 is an enlarged sectional view for showing a schematic configuration of the vicinity of a through hole and a positioning part of the sealing device according to the embodiment of the present disclosure.

FIG. 1 is a sectional view for showing a schematic configuration of a sealing device 1 according to the embodiment of the present disclosure. FIG. 2 is an enlarged sectional view for showing a schematic configuration of the vicinity of a through hole 24 and a positioning part 36 of the sealing device 1. In FIGS. 1 and 2, only a one-side portion of the sealing device 1 is shown. The sealing device 1 is used in an environment full of dirt or dust, for example, a truck of a railroad vehicle, a truck of a sintering pallet, a construction machine, a trunnion-type suspension of a truck, and an agricultural machine (such as a tiller, a tractor, and a rice transplanter). The sealing device 1 has a role in sealing a gap between: an annular outer periphery side member; and an annular inner periphery side member at least partially surrounded by the outer periphery side member, the outer periphery side member and the inner periphery side member being relatively rotatable to each other. Note that, the target to which the sealing device 1 is applied is not limited to the above.

The sealing device 1 according to the embodiment of the present disclosure is a sealing device that seals a gap between: an annular outer periphery side member 101; and an annular inner periphery side member 102 at least partially surrounded by the outer periphery side member 101, the outer periphery side member 101 and the inner periphery side member 102 being relatively rotatable to each other with respect to an axis Y1. The sealing device 1 includes: a sealing device main body 10 to be attached to the outer periphery side member 101; and a slinger 40 to be attached to the inner periphery side member 102.

The sealing device main body 10 includes: an annular reinforcement ring 20 centered on the axis Y1; and an annular elastic body part 30 that is made of an elastic body attached to the reinforcement ring 20 and is centered on the axis Y1. The through hole 24 that passes through a portion between an internal space side surface and an atmosphere side surface of the reinforcement ring 20 is formed in the reinforcement ring 20, and the positioning part 36 for fixing the position of the reinforcement ring 20 at the time of vulcanization is formed on an internal space side surface of the elastic body part 30. In the sealing device 1, the through hole 24 and the positioning part 36 are formed at positions separated in the radial direction. Hereinafter, a configuration of the sealing device 1 will be specifically described.

In the following description, for convenience of the description, one (an arrow a direction) of the directions of the axis Y1 (hereinafter, also referred to as the axis Y1 direction) corresponding to the axis of the sealing device 1 in FIGS. 1 and 2 is defined as the internal space side, and another (an arrow b direction) thereof is defined as the atmosphere side. Moreover, one (an arrow c direction) of the extending directions orthogonal to the axis Y1 (hereinafter, also referred to as the radial direction) of the sealing device 1 in FIGS. 1 and 2 is defined as the inner periphery side, and another (an arrow d direction) thereof is defined as the outer periphery side. The positional relation and the direction of each member in the following description respectively represent the positional relation and the direction thereof in the drawings, and do not represent the positional relation and the direction thereof when each member is incorporated in an actual vehicle or the like.

As shown in FIG. 1, the outer shape of the sealing device 1 is formed in a circular or substantially circular shape around the axis Y1, and a cylindrical or substantially cylindrical opening part 2 is formed in a central portion of the sealing device 1. The sealing device 1 includes: the sealing device main body 10 having a circular or substantially circular shape around the axis Y1; and the slinger 40 that is formed on the inner periphery side of the sealing device main body 10 and has a cylindrical or substantially cylindrical shape around the axis Y1.

In the sealing device 1, the outer shape of the sealing device main body 10 is formed in a circular or substantially circular shape around the axis Y1. The sealing device main body 10 includes: the reinforcement ring 20 having a circular or substantially cylindrical shape around the axis Y1; and the elastic body part 30 that is formed by an elastic body molded integrally with the reinforcement ring 20 and has a circular or substantially circular shape around the axis Y1.

The elastic body of the elastic body part 30 is, for example, a rubber material such as fluororubber and acrylic rubber. The reinforcement ring 20 is made of, for example, metal, and is produced by press working and forging, and the elastic body part 30 is molded by cross-linking (vulcanization) molding using a mold.

The reinforcement ring 20 includes: a tubular part 21; an annular inner periphery side flange part 22 that extends to the inner periphery side from an internal space side end portion corresponding to an end portion on the internal space side of the tubular part 21; and an annular outer periphery side flange part 23 that extends to the outer periphery side from an atmosphere side end portion corresponding to an end portion on the atmosphere side of the tubular part 21. Specifically, the tubular part 21 extends parallel or substantially parallel to the axis Y1 direction, and is formed in a cylindrical or substantially cylindrical shape around the axis Y1. The internal space side end portion, the atmosphere side end portion, an inner periphery side surface, and an outer periphery side surface of the tubular part 21 are buried in the elastic body part 30.

The inner periphery side flange part 22 is a flange part that extends parallel or substantially parallel to the radial direction, extends to the inner periphery side from the internal space side end portion of the tubular part 21, and has a circular or substantially circular shape around the axis Y1. An internal space side surface, an atmosphere side surface, an inner periphery side end portion, and an outer periphery side end portion (the internal space side end portion of the tubular part 21) of the inner periphery side flange part 22 are buried in the elastic body part 30.

The through hole 24 that passes through a portion between the internal space side surface and the atmosphere side surface of the inner periphery side flange part 22 of the reinforcement ring 20 is formed in a central portion in the radial direction of the inner periphery side flange part 22. The through hole 24 is formed in, for example, a cylindrical or substantially cylindrical shape, and a plurality (for example, eight) of the through holes 24 are formed at equal angular intervals or substantially equal angular intervals concentrically or substantially concentrically from the axis Y1. The diameter of the through hole 24 is, for example, 3 mm, and the through hole 24 is filled with the elastic body of the elastic body part 30.

The outer periphery side flange part 23 is a flange part that extends parallel or substantially parallel to the radial direction, extends to the outer periphery side from the atmosphere side end portion of the tubular part 21, and has a circular or substantially circular shape around the axis Y1. An inner periphery side end portion (the atmosphere side end portion of the tubular part 21) and an atmosphere side surface of the outer periphery side flange part 23 are buried in the elastic body part 30, and a large portion of an outer periphery side end portion and an internal space side surface of the outer periphery side flange part 23 are exposed from the elastic body part 30.

The elastic body part 30 includes an internal space side elastic body part 31, an atmosphere side elastic body part 32, a seal lip part 33, and a dust lip part 34. Specifically, the internal space side elastic body part 31 includes: an outer periphery side portion 31*d* that extends parallel or substantially parallel to the axis Y1 direction and is formed in a cylindrical or substantially cylindrical shape around the axis Y1; and an internal space side portion 31a that extends parallel or substantially parallel to the radial direction, extends to the outer periphery side from an internal space side end portion of the outer periphery side portion 31d, and has a circular or substantially circular shape around the axis Y1.

The internal space side elastic body part 31 covers the outer periphery side surface of the tubular part 21, the internal space side end portion of the tubular part 21 (the outer periphery side end portion of the inner periphery side flange part 22), and the internal space side surface of the inner periphery side flange part 22. The internal space side elastic body part 31 includes an outer periphery side lip part 35 that extends to the outer periphery side from the outer periphery side portion 31d and has a circular or substantially circular shape around the axis Y1.

The positioning part 36 for fixing the position of the reinforcement ring 20 at the time of vulcanization is formed in the internal space side portion 31a of the internal space side elastic body part 31. The positioning part 36 is an annular groove part that is formed on the outer periphery side and/or the inner periphery side of the through hole 24 and is concave from the internal space side to the atmosphere side. Specifically, the positioning part 36 includes an inner periphery side positioning part 36c and an outer periphery side positioning part 36d.

As shown in FIG. 2, the inner periphery side positioning part 36c is a groove part that is rectangular or substantially rectangular in a cross-section view and is concave from an internal space side surface 31aa of the internal space side portion 31a of the internal space side elastic body part 31 toward the internal space side surface of the inner periphery side flange part 22 of the reinforcement ring 20, on the inner periphery side of the through hole 24. Moreover, the inner periphery side positioning part 36c is a circumferential groove that is formed in a bottomed cylindrical or substantially bottomed cylindrical shape around the axis Y1.

The inner periphery side positioning part 36c has a circular or substantially circular bottom surface 36ct that extends parallel or substantially parallel to the radial direction, at a position having a predetermined depth on the atmosphere side from the internal space side surface 31aa of the internal space side portion 31a of the inner periphery side positioning part 36c. The bottom surface 36ct does not reach the internal space side surface of the inner periphery side flange part 22 of the reinforcement ring 20, and defines the boundary on the atmosphere side of the inner periphery side positioning part 36c.

An inner periphery side surface 36cc is formed on the inner periphery side of the bottom surface 36ct of the inner periphery side positioning part 36c, and an outer periphery side surface 36cd is formed on the outer periphery side of the bottom surface 36ct of the inner periphery side positioning part 36c. The inner periphery side surface 36cc of the inner periphery side positioning part 36c is a surface that defines the boundary on the inner periphery side of the inner periphery side positioning part 36c, and the outer periphery side surface 36cd of the inner periphery side positioning part 36c is a surface that defines the boundary on the outer periphery side of the inner periphery side positioning part 36c.

The inner periphery side surface 36cc of the inner periphery side positioning part 36c is a cylindrical or substantially cylindrical surface that extends along the axis Y1 direction and extends toward the internal space side from the edge on the inner periphery side of the bottom surface 36ct with the axis Y1 being centered. The outer periphery side surface 36cd of the inner periphery side positioning part 36c is a cylindrical or substantially cylindrical surface that extends along the axis Y1 direction toward the internal space side from the edge on the outer periphery side of the bottom surface 36ct with the axis Y1 being centered.

The outer periphery side positioning part 36d is a groove part that is rectangular or substantially rectangular in a cross-section view and is concave from the internal space side surface 31aa of the internal space side portion 31a of the internal space side elastic body part 31 toward the internal space side surface of the inner periphery side flange part 22 of the reinforcement ring 20, on the outer periphery side of the through hole 24. Moreover, the outer periphery side positioning part 36d is a circumferential groove that is formed in a bottomed cylindrical or substantially bottomed cylindrical shape around the axis Y1.

The outer periphery side positioning part 36d has a circular or substantially circular bottom surface 36dt that extends parallel or substantially parallel to the radial direction, at a position having a predetermined depth on the atmosphere side from the internal space side surface 31aa of the internal space side portion 31a of the internal space side elastic body part 31. The bottom surface 36dt does not reach the internal space side surface of the inner periphery side flange part 22 of the reinforcement ring 20, and defines the boundary on the atmosphere side of the outer periphery side positioning part 36d.

An inner periphery side surface 36dc is formed on the inner periphery side of the bottom surface 36dt of the outer periphery side positioning part 36d, and an outer periphery side surface 36dd is formed on the outer periphery side of the bottom surface 36dt of the outer periphery side positioning part 36d. The inner periphery side surface 36dc of the outer periphery side positioning part 36d is a surface that defines the boundary on the inner periphery side of the outer periphery side positioning part 36d, and the outer periphery side surface 36dd of the outer periphery side positioning part 36d is a surface that defines the boundary on the outer periphery side of the outer periphery side positioning part 36d.

The inner periphery side surface 36dc of the outer periphery side positioning part 36d is a cylindrical or substantially cylindrical surface that extends along the axis Y1 direction and extends toward the internal space side from the edge on the inner periphery side of the bottom surface 36dt with the axis Y1 being centered. The outer periphery side surface 36dd of the outer periphery side positioning part 36d is a cylindrical or substantially cylindrical surface that extends along the axis Y1 direction toward the internal space side from the edge on the outer periphery side of the bottom surface 36dt with the axis Y1 being centered.

Here, in the sealing device 1, the through hole 24 and the positioning part 36 are formed at positions separated in the radial direction. Specifically, the outer periphery side surface 36cd of the inner periphery side positioning part 36c is formed on the inner periphery side from a peripheral surface of the through hole 24, and the inner periphery side surface 36dc of the outer periphery side positioning part 36d is formed on the outer periphery side from the peripheral surface of the through hole 24. That is, a predetermined width W1 is formed between the outer periphery side surface 36cd of the inner periphery side positioning part 36c and the peripheral surface of the through hole 24, and a predetermined width W2 is formed between the inner periphery side surface 36dc of the outer periphery side positioning part 36d and the peripheral surface of the through hole 24. The entire bottom surface 36ct of the inner periphery side positioning part 36c and the entire bottom surface 36dt of the outer periphery side positioning part 36d are opposed to the internal space side surface 22a of the inner periphery side flange part 22.

The atmosphere side elastic body part 32 includes an inner periphery side portion 32c that extends parallel or substantially parallel to the axis Y1 direction and is formed in a cylindrical or substantially cylindrical shape around the axis Y1. Moreover, the atmosphere side elastic body part 32 includes: an outer periphery atmosphere side portion 32d that extends parallel or substantially parallel to the radial direction, extends to the outer periphery side from an atmosphere side end portion of the inner periphery side portion 32c, and has a circular or substantially circular shape around the axis Y1; and an inner periphery atmosphere side portion 32b that extends parallel or substantially parallel to the radial direction, extends to the inner periphery side from an internal space side end portion of the inner periphery side portion 32c, and has a circular or substantially circular shape around the axis Y1.

The atmosphere side elastic body part 32 covers the atmosphere side surface of the outer periphery side flange part 23, the inner periphery side end portion of the outer periphery side flange part 23 (the atmosphere side end portion of the tubular part 21), the inner periphery side surface of the tubular part 21, the internal space side end portion of the tubular part 21 (the outer periphery side end portion of the inner periphery side flange part 22), and the atmosphere side surface of the inner periphery side flange part 22 of the reinforcement ring 20. A thickness T1 of the inner periphery atmosphere side portion 32b of the elastic body part 30 formed on the atmosphere side of the reinforcement ring 20 is thicker than a thickness T2 of the internal space side portion 31a of the elastic body part 30 formed on the internal space side of the reinforcement ring 20.

An atmosphere side positioning part 37 for fixing the position of the reinforcement ring 20 at the time of vulcanization is formed on an outer periphery atmosphere side surface of the outer periphery atmosphere side portion 32d of the atmosphere side elastic body part 32. The atmosphere side positioning part 37 is a groove part that is rectangular or substantially rectangular in a cross-section view and is concave from the outer periphery atmosphere side surface of the outer periphery atmosphere side portion 32d toward the atmosphere side surface of the outer periphery side flange part 23 of the reinforcement ring 20, in a central portion in the radial direction of the outer periphery atmosphere side portion 32d. Moreover, the atmosphere side positioning part 37 is a circumferential groove that is formed in a bottomed cylindrical or substantially bottomed cylindrical shape around the axis Y1.

The inner periphery atmosphere side portion 32b of the atmosphere side elastic body part 32 is connected to the internal space side portion 31a of the internal space side elastic body part 31 by filling the inside of the through hole 24 of the inner periphery side flange part 22 of the reinforcement ring 20 with the elastic body, whereby the adhesion force between the reinforcement ring 20 and the elastic body part 30 can be improved.

The seal lip part 33 further extends to the internal space side as progress from an inner periphery side end portion of the internal space side portion 31a of the internal space side elastic body part 31 toward the inner periphery side, and is formed in a truncated conical or substantially truncated conical shape, and the seal lip part 33 includes a lip leading end part 33a at its leading end. The lip leading end part 33a is a circular or substantially circular lip whose cross-sectional shape is a wedge shape that is convex toward the inner periphery side, and the lip leading end part 33a is formed so as to closely contact the slinger 40 slidably together with the slinger 40. Moreover, a garter spring 38 that presses the lip leading end part 33a to the inner periphery side in the radial direction is fitted on the outer periphery side of the lip leading end part 33a.

The dust lip part 34 includes a first dust lip part 34a, a second dust lip part 34b, and a third dust lip part 34c in the stated order from the internal space side. The first dust lip part 34a is a truncated conical or substantially truncated conical lip that further extends to the atmosphere side as progress from the inner periphery side end portion of the internal space side portion 31a of the internal space side elastic body part 31 toward the inner periphery side, and the first dust lip part 34a is formed so as to closely contact the slinger 40 slidably together therewith.

The second dust lip part 34b is a truncated conical or substantially truncated conical lip that further extends to the atmosphere side as progress from an inner periphery side end portion of the inner periphery atmosphere side portion 32b of the atmosphere side elastic body part 32 toward the inner periphery side, and the second dust lip part 34b is formed so as to closely contact the slinger 40 slidably together therewith. The third dust lip part 34c is a truncated conical or substantially truncated conical lip that further extends to the outer periphery side as progress from the inner periphery side end portion of the inner periphery atmosphere side portion 32b of the atmosphere side elastic body part 32 toward the atmosphere side, and the third dust lip part 34c is formed so as to closely contact the slinger 40 slidably together therewith.

In the sealing device 1, the slinger 40 is formed on the inner periphery side of the sealing device main body 10, and the outer shape of the slinger 40 is formed in a circular or substantially circular shape around the axis Y1. The slinger 40 includes: a reinforcement ring 50 having a circular or substantially cylindrical shape around the axis Y1; and an elastic body part 60 that is formed by an elastic body molded integrally with the reinforcement ring 50 and has a circular or substantially circular shape around the axis Y1.

The elastic body of the elastic body part 60 is, for example, a rubber material such as fluororubber and acrylic rubber. The reinforcement ring 50 is made of, for example, metal, and is produced by press working and forging, and the elastic body part 60 is molded by cross-linking (vulcanization) molding using a mold.

The reinforcement ring 50 includes: a tubular part 51; and an annular outer periphery side flange part 52 that extends to the outer periphery side from an atmosphere side end portion 51b corresponding to an end portion on the atmosphere side of the tubular part 51. Specifically, the tubular part 51 extends parallel or substantially parallel to the axis Y1 direction, and is formed in a cylindrical or substantially cylindrical shape around the axis Y1. The atmosphere side end portion and an inner periphery side surface of the tubular part 51 are buried in the elastic body part 60, and an internal space side end portion and an outer periphery side surface of the tubular part 51 are exposed from the elastic body part 60. The outer periphery side surface of the tubular part 51 closely contacts the seal lip part 33, the first dust lip part 34a, and the second dust lip part 34b slidably together therewith.

The outer periphery side flange part 52 is a flange part that extends parallel or substantially parallel to the radial direction, extends to the outer periphery side from the atmosphere side end portion of the tubular part 51, and has a circular or substantially circular shape around the axis Y1. An outer periphery side end portion, an inner periphery side end portion (the atmosphere side end portion of the tubular part 51), and an atmosphere side surface of the outer periphery side flange part 52 are buried in the elastic body part 60, and an internal space side surface of the outer periphery side flange part 52 is exposed from the elastic body part 60. The internal space side surface 52*a* of the outer periphery side flange part 52 closely contacts the third dust lip part 34*c* slidably together therewith.

The elastic body part 60 includes: an inner periphery side portion 61 that extends parallel or substantially parallel to the axis Y1 direction and is formed in a cylindrical or substantially cylindrical shape around the axis Y1; and an atmosphere side portion 62 that extends parallel or substantially parallel to the radial direction, extends to the outer periphery side from an atmosphere side end portion of the inner periphery side portion 61, and has a circular or substantially circular shape around the axis Y1. Moreover, the elastic body part 60 includes an inner periphery side lip part 63 that extends to the inner periphery side from the inner periphery side portion 61 and has a circular or substantially circular shape around the axis Y1.

The inner periphery side portion 61 of the elastic body part 60 covers the inner periphery side surface and the atmosphere side end portion of the tubular part 51. The atmosphere side portion 62 of the elastic body part 60 covers the inner periphery side end portion (the atmosphere side end portion of the inner periphery side portion 61), the atmosphere side surface, and the outer periphery side end portion of the atmosphere side portion 62. An outer periphery side end portion of the atmosphere side portion 62 of the elastic body part 60 is opposed to the outer periphery atmosphere side portion 32*d* of the atmosphere side elastic body part 32 of the elastic body part 30 with a predetermined clearance therebetween, and a gap G is formed between the outer periphery side end portion of the atmosphere side portion 62 of the elastic body part 60 and the outer periphery atmosphere side portion 32*d* of the atmosphere side elastic body part 32.

Figure 3:
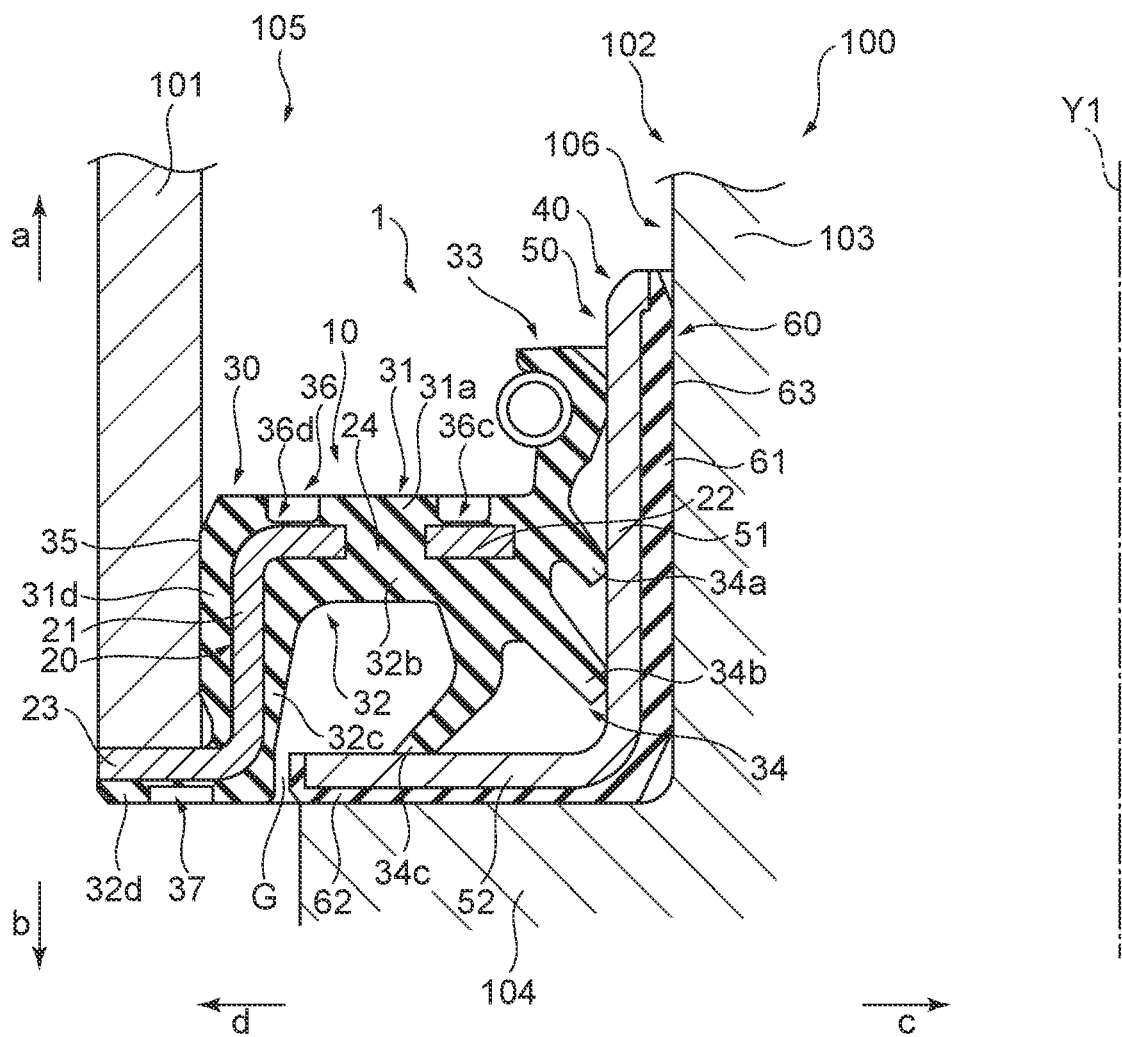
FIG. 3 is a sectional view showing a schematic configuration of a sealing structure corresponding to the state where the sealing device according to the embodiment of the present disclosure is incorporated in a sealing target.

Next, a sealing structure 100 corresponding to the state where the sealing device 1 is incorporated will be described. FIG. 3 is a sectional view showing a schematic configuration of the sealing structure 100 corresponding to the state where the sealing device 1 according to the embodiment of the present disclosure is incorporated in a sealing target. In FIG. 3, only a one-side portion of the sealing structure 100 and the sealing device 1 is shown. The sealing structure 100 is configured by incorporating the sealing device 1 in an annular gap between: the annular outer periphery side member 101; and the annular inner periphery side member 102 at least partially surrounded by the outer periphery side member 101, the outer periphery side member 101 and the inner periphery side member 102 being relatively rotatable to each other with respect to the axis Y1, and the sealing structure 100 is intended to achieve sealing of the annular gap between the outer periphery side member 101 and the inner periphery side member 102.

The inner periphery side member 102 includes: a rod-like part 103 that extends parallel or substantially parallel to the axis Y1 direction and is formed in a columnar or substantially columnar shape around the axis Y1; and an outer periphery side flange part 104 that extends parallel or substantially parallel to the radial direction, extends to the outer periphery side from an atmosphere side end portion 103*b* of the rod-like part 103, and has a circular or substantially circular shape around the axis Y1. The outer periphery side member 101 is arranged on the outer periphery side of the inner periphery side member 102, and an opening part 105 having a cylindrical or substantially cylindrical shape around the axis Y1 is formed in the outer periphery side member 101.

The inner periphery side member 102 is inserted in the opening part 105 of the outer periphery side member 101, and an annular space is formed between the opening part 105 and an outer periphery side surface of the rod-like part 103 of the inner periphery side member 102. That is, the outer periphery side member 101, the rod-like part 103 of the inner periphery side member 102, and the outer periphery side flange part 104 thereof form an accommodating part 106 for accommodating the sealing device 1. The accommodating part 106 is concave from the internal space side to the atmosphere side of the outer periphery side member 101 and the inner periphery side member 102, and a predetermined clearance is formed between the outer periphery side member 101 and the outer periphery side flange part 104 of the inner periphery side member 102.

The slinger 40 of the sealing device 1 is fixed by, for example, interference fit to the outer periphery side surface of the rod-like part 103 of the inner periphery side member 102, by means of the inner periphery side lip part 63 of the inner periphery side portion 61 of the elastic body part 60, and the atmosphere side portion 62 of the elastic body part 60 of the slinger 40 closely contacts an internal space side surface of the outer periphery side flange part 104 of the inner periphery side member 102. The sealing device main body 10 of the sealing device 1 is fixed by, for example, interference fit to the opening part 105 of the outer periphery side member 101, by means of the outer periphery side lip part 35 of the internal space side elastic body part 31 of the elastic body part 30, and the internal space side surface of the outer periphery side flange part 23 of the sealing device main body 10 closely contacts an atmosphere side end portion of the outer periphery side member 101.

The seal lip part 33 of the elastic body part 30 of the sealing device main body 10 of the sealing device 1 and the first dust lip part 34*a* and the second dust lip part 34*b* of the dust lip part 34 thereof closely contact the outer periphery side surface of the tubular part 51 of the slinger 40 slidably together therewith. Moreover, the third dust lip part 34*c* of the dust lip part 34 closely contacts the internal space side surface of the outer periphery side flange part 52 of the slinger 40 slidably together therewith.

The gap G is formed between the outer periphery side end portion of the inner periphery side portion 61 of the elastic body part 60 and the outer periphery atmosphere side portion 32*d* of the atmosphere side elastic body part 32, and the outer periphery side end portion of the inner periphery side portion 61 and the outer periphery atmosphere side portion 32*d* of the atmosphere side elastic body part 32 reduces the predetermined clearance between the outer periphery side member 101 and the outer periphery side flange part 104 of the inner periphery side member 102. As a result, by incorporating the sealing device 1 in the annular gap between: the annular outer periphery side member 101; and the annular inner periphery side member 102 at least partially surrounded by the outer periphery side member 101, the sealing structure 100 can achieve the sealing of the annular gap between the outer periphery side member 101 and the inner periphery side member 102.

As described above, in the sealing device 1, the sealing device main body 10 includes: the annular reinforcement ring 20 centered on the axis Y1; and the annular elastic body part 30 that is made of the elastic body attached to the reinforcement ring 20 and is centered on the axis Y1. The through hole 24 that passes through the portion between the internal space side surface and the atmosphere side surface of the reinforcement ring 20 is formed in the reinforcement ring 20, and the positioning part 36 for fixing the position of the reinforcement ring 20 at the time of vulcanization is formed on the internal space side surface of the elastic body part 30. In the sealing device 1, the through hole 24 and the positioning part 36 are formed at positions separated in the radial direction. Therefore, even in the case where, due to swelling and shrinking of the rubber material of the elastic body part 30 caused by the attachment of a solvent, a crack occurs from the positioning part 36 corresponding to a portion having a thinner thickness, of the rubber material of the elastic body part 30, because the through hole 24 and the positioning part 36 are separated from each other in the radial direction, the crack that has occurred from the positioning part 36 is stopped by the reinforcement ring 20, and this crack can be suppressed from growing through the through hole 24 to become a through crack.

Moreover, in the sealing device 1, the thickness T1 of the inner periphery atmosphere side portion 32b of the elastic body part 30 formed on the atmosphere side of the reinforcement ring 20 is thicker than the thickness T2 of the internal space side portion 31a of the elastic body part 30 formed on the internal space side of the reinforcement ring 20. Therefore, the above-mentioned crack can be further suppressed from growing through the through hole 24 to become a through crack. Moreover, in the sealing device 1, the positioning part 36 is the annular groove part that is formed on the outer periphery side and/or the inner periphery side of the through hole 24 and is concave from the internal space side to the atmosphere side. Therefore, the position of the reinforcement ring 20 at the time of vulcanization can be easily fixed.

Hereinabove, the preferred embodiment of the present disclosure has been described, but the present disclosure is not limited to the above-mentioned embodiment, and includes all aspects within concepts and Claims of the present disclosure. Moreover, respective configurations may be selectively combined as appropriate such that at least part of the above-mentioned problem is solved and that at least part of the above-mentioned effect is obtained. Moreover, for example, the shape, material, arrangement, size, and the like of each constituent element in the above-mentioned embodiment can be changed as appropriate in accordance with a specific aspect of usage of the present disclosure.

For example, the embodiment of the present disclosure has been described by taking, as an example, the case where: the through hole 24 of the sealing device 1 according to the embodiment of the present disclosure is formed in, for example, a cylindrical or substantially cylindrical shape; and a plurality (for example, eight) of the through holes 24 are formed at equal angular intervals or substantially equal angular intervals concentrically or substantially concentrically from the axis Y1. However, the present disclosure is not limited thereto, and the through hole 24 may be a hole having an arbitrary shape, and also may be formed such that the position, number, and size of the hole is an arbitrary position, number, and size, respectively.

Moreover, the embodiment of the present disclosure has been described by taking, as an example, the case where the positioning part 36 of the sealing device 1 according to the embodiment of the present disclosure is the annular groove part that is formed on the outer periphery side and/or the inner periphery side of the through hole 24 and is concave from the internal space side to the atmosphere side. However, the present disclosure is not limited thereto, and the positioning part 36 may have an arbitrary shape as long as the position of the reinforcement ring 20 at the time of vulcanization can be fixed.

The invention claimed is:

1. A sealing device that seals a gap between: an annular outer periphery side member; and an annular inner periphery side member at least partially surrounded by the outer periphery side member, the outer periphery side member and the inner periphery side member being relatively rotatable to each other with respect to an axis, the sealing device comprising:
    a sealing device main body to be attached to the outer periphery side member; and
    a slinger to be attached to the inner periphery side member,
    wherein
    the sealing device main body includes: an annular reinforcement ring centered on the axis; and an annular elastic body part that is made of an elastic body attached to the reinforcement ring and is centered on the axis,
    a through hole that passes through a portion between an internal space side surface and an atmosphere side surface of the reinforcement ring is formed in the reinforcement ring,
    a positioning part for fixing a position of the reinforcement ring at a time of vulcanization is formed on an internal space side surface of the elastic body part,
    the through hole and the positioning part are formed at positions separated in a radial direction, and
    wherein the positioning part includes an inner periphery side positioning part that is formed on the inner periphery side with respect to the through hole and an outer periphery side positioning part that is formed on the outer periphery side with respect to the through hole.

2. A sealing device configured to seal a gap between an annular outer periphery side member and an annular inner periphery side member, the outer periphery side member and the inner periphery side member being rotatable relative to each other with respect to a longitudinally extending axis, the sealing device comprising:
    a sealing device main body to be attached to the outer periphery side member; and
    a slinger to be attached to the inner periphery side member,
    wherein the sealing device main body is centered on the longitudinally extending axis and includes an annular reinforcement ring and an annular elastic body that is attached to the annular reinforcement ring,
    the annular reinforcement ring has a first leg that is attached to the outer periphery side member and extends in a radial direction toward the inner periphery side member and the longitudinally extending axis, a second leg that is attached to the first leg and extends in an axial direction in parallel with the longitudinally extending axis, and a third leg that is attached to the second leg and extends in the radial direction toward the inner periphery side member and the longitudinally extending axis,
    a through hole is formed in the third leg that extends in the axial direction,
    the elastic body has an internal space side surface and an atmosphere side surface, and a material of the elastic body formed in the through hole connects the internal space side surface and the atmosphere side surface, a first positioning part and a second positioning part that are each in the form of a groove for fixing a position of the reinforcement ring at a time of vulcanization are formed on the internal space side surface of the elastic body, the through hole and the first and second positioning parts are formed at positions separated in the radial direction, and the first positioning part is radially separated from the through hole at a greater distance in comparison to the second positioning part.

3. A sealing device that seals a gap between: an annular outer periphery side member; and an annular inner periphery side member at least partially surrounded by the outer periphery side member, the outer periphery side member and the inner periphery side member being relatively rotatable to each other with respect to an axis, the sealing device comprising:

a sealing device main body to be attached to the outer periphery side member; and a slinger to be attached to the inner periphery side member, wherein the sealing device main body includes: an annular reinforcement ring centered on the axis; and an annular elastic body part that is made of an elastic body attached to the reinforcement ring and is centered on the axis, a through hole that passes through a portion between an internal space side surface and an atmosphere side surface of the reinforcement ring is formed in the reinforcement ring, a positioning part for fixing a position of the reinforcement ring at a time of vulcanization is formed on an internal space side surface of the elastic body part, and the through hole and the positioning part are formed at positions separated in a radial direction, wherein a thickness of the elastic body part formed on an atmosphere side of the reinforcement ring is thicker than a thickness of the elastic body part formed on an internal space side of the reinforcement ring, and wherein the positioning part includes an inner periphery side positioning part that is formed on the inner periphery side with respect to the through hole and an outer periphery side positioning part that is formed on the outer periphery side with respect to the through hole.

* * * * *